United States Patent
Alanen et al.

(10) Patent No.: US 10,412,671 B2
(45) Date of Patent: Sep. 10, 2019

(54) PROXY SERVICE AND POWER SAVINGS IN WIRELESS DEVICE

(71) Applicant: Nokia Technologies Oy, Espoo (FI)

(72) Inventors: Olli Petteri Alanen, Vantaa (FI); Enrico Henrik Rantala, Berkeley, CA (US); Mika Ilkka Tapani Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/841,896

(22) Filed: Dec. 14, 2017

(65) Prior Publication Data

US 2019/0191371 A1    Jun. 20, 2019

(51) Int. Cl.
| | |
|---|---|
| H04W 52/02 | (2009.01) |
| H04W 88/18 | (2009.01) |
| H04W 8/00 | (2009.01) |
| H04L 29/08 | (2006.01) |

(52) U.S. Cl.
CPC ..... *H04W 52/0216* (2013.01); *H04W 88/182* (2013.01); *H04L 67/28* (2013.01); *H04W 8/005* (2013.01)

(58) Field of Classification Search
None
See application file for complete search history.

(56) References Cited

U.S. PATENT DOCUMENTS

| | | | |
|---|---|---|---|
| 9,591,582 B1 * | 3/2017 | Rabii | H04W 52/028 |
| 9,648,485 B2 | 5/2017 | Abraham et al. | |
| 2004/0128310 A1 | 7/2004 | Zmudzinski et al. | |
| 2006/0087993 A1 * | 4/2006 | Sengupta | H04W 68/00 370/310 |
| 2010/0157866 A1 | 6/2010 | Sarikaya et al. | |
| 2012/0311101 A1 * | 12/2012 | Chao | H04L 12/189 709/219 |

(Continued)

FOREIGN PATENT DOCUMENTS

EP    2632218 A2    8/2013

OTHER PUBLICATIONS

"Wi-Fi Neighbor Awareness Networking (NAN) Technical Specification", Wi-Fi Alliance, Version 1.0 r32, pp. 1-297.

(Continued)

*Primary Examiner* — Hong S Cho
(74) *Attorney, Agent, or Firm* — Harrington & Smith (57) ABSTRACT

This document discloses a solution for using a proxy for a service to improve power-efficiency. According to an aspect, a method comprises: offloading, by a wireless device configured to provide a service, at least one function of the service to a proxy apparatus by using a main radio interface of the wireless device; indicating, by the wireless device to the proxy apparatus in connection with said offloading, that the wireless device shall enter a power-save mode where the wireless device disables the main radio interface and enables a wake-up radio interface of the wireless device; receiving, by the wireless device while in the power-save mode, a wake-up frame through the wake-up radio interface and, as a response to the reception of the wake-up frame, enabling the main radio interface; and after enabling the main radio interface, receiving by the wireless device a message from a subscriber device that subscribes to the service.

8 Claims, 7 Drawing Sheets

(56) References Cited

U.S. PATENT DOCUMENTS

2014/0112232 A1\* 4/2014 Lu .......................... H04W 4/18
                                                         370/311
2014/0269426 A1\* 9/2014 Lambert ................ G06Q 30/02
                                                         370/254

OTHER PUBLICATIONS

Apr. 3, 2019—Extended European Search Report—EP Application No. 18211199.7.

\* cited by examiner

Fig 11 though the specification may refer to "an", "one", or "some" embodiments in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features

PROXY SERVICE AND POWER SAVINGS IN WIRELESS DEVICE

FIELD

The invention relates to the field of wireless networking and, particularly, to improving power savings in connection with a service using a proxy.

BACKGROUND

With the development of Internet-of-Things concept, a number of networking devices is increasing. The networking devices may be small and provided with very limited power supply. Therefore, power saving features are constantly developed.

Some of such devices may provide other devices with a service that involves wireless communications between a service provider and a service subscriber. At least some features of the service may employ a third device in the form of a proxy. The proxy may mediate a function of the service such as service discovery.

BRIEF DESCRIPTION

Some aspects of the invention are defined by the independent claims.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
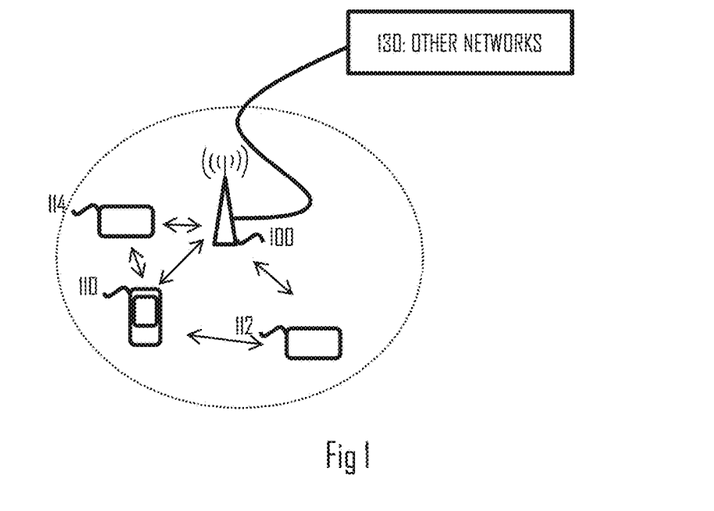
FIG. 1 illustrates a wireless communication scenario to which embodiments of the invention may be applied.

A wireless communication scenario to which embodiments of the invention may be applied is illustrated in FIG. 1. FIG. 1 illustrates a plurality of wireless devices 100, 110 112, 114. A wireless device 100 may operate as an access node managing a wireless network and providing the other wireless devices 110 to 114 with wireless access, e.g. to other networks 130 such as the Internet. Some of the wireless devices 110 to 114 may form an ad hoc network. The ad hoc network may comply with neighbor awareness networking (NAN) principles described in greater detail below. The wireless devices 100 to 114 may employ a physical layer and a medium access control (MAC) layer that comply with wireless local area network (WLAN) specifications based on IEEE 802.11 but, in other embodiments, the wireless devices may support another wireless communication protocol as an alternative or in addition to the WLAN. For example, the access node 100 may provide a 802.11 network while the ad hoc network may use another physical layer and MAC specification, such as the Bluetooth® technology. In the WLAN specifications, a wireless network may be called a basic service set (BSS). While embodiments of the invention are described in the context of the IEEE 802.11, it should be appreciated that these or other embodiments of the invention may be applicable to wireless networks based on other specifications, e.g. WiMAX (Worldwide Interoperability for Microwave Access), UMTS LTE (Long-term Evolution for Universal Mobile Tele-communication System), mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups. Therefore, the following description may be generalized to other systems as well.

The access node 100 may be a fixed access point or a mobile access point. The wireless devices 110 to 114 may be terminal devices capable of connecting to the access node 100 in addition to operating in the ad hoc network. The wireless devices 110 to 114 may have different capabilities, as described in greater detail below.

Let us now describe an embodiment of the ad hoc network of the wireless devices 110 to 114 in greater detail. Applications for short-range wireless devices are evolving to include awareness applications providing the device with awareness about a local network environment. A non-limiting example of a neighbor awareness network architecture is Neighbor Awareness Networking (NAN) technology of Wi-Fi Alliance, a network of wireless mobile devices self-organizing to support various applications, ranging from social networking to service discovery. Awareness information may be shared by a short-range wireless device sending an anonymous flooding message that may include a query, over an ad hoc network. A neighboring short-range wireless device may reply to the flooding message over the ad hoc network with a response, such as a pointer to a discovered location-based service.

Awareness information may include any information and/or context about a local network environment as well as the users and communication devices within the local network environment. Wireless devices may continuously collect and exchange information with other devices in a local network environment. Awareness applications running on short-range wireless devices may perform one or more of the following functions: create a network for sharing awareness information, locate and organize awareness information, form communities for sharing awareness information, manage power consumption for devices engaged in sharing awareness information, develop applications to take advantage of the awareness information, and maintain the privacy and anonymity of users sharing awareness information.

Awareness applications running on short-range wireless devices may employ a physical layer and a MAC layer based on the IEEE 802.11 technology. The awareness application may build upon a scheme in which every device is responsible for participating in beaconing and all the other basic operations that keep the ad hoc network in operation. An ad hoc network may be designed to have one network identifier (NWID) that all of the devices in the network share. The NWID may be announced in the beacons transmitted by the devices. In the overall design, those devices that operate under same NWID are driven to use a common and shared schedule to allow for awareness information gathering among all the devices within range. The determination of which schedule is used by a device may be made by the network instance timer value, and this timer value is communicated in beacons in the timing synchronization function (TSF) value parameter. The devices may be required to operate by assuming the oldest TSF value (i.e. largest TSF value) contained in the received beacons that represent the network with the NWID in which the devices are operating. Alternatively the devices may be required to select the schedule which to follow based on some other criteria than the TSF value. Beacons may, as an example, contain some other information than the TSF that is used by the devices to determine which schedule to use.

When a physical radio and a MAC entity of a wireless device transmits a beacon, the beacon's MAC-header may contain device's own current TSF value. The device may automatically transmit a reply message when it receives a beacon from another network, the reply message being referred herein as a beacon response message. The beacon response message contains the current TSF value of the replying network. Alternatively the beacon response message may contain other information that is used to determine which schedule to use.

Wireless devices form a network where all devices in proximity may communicate with each other. When two or more groups of devices forming two or more instances of the network come close to each other, the two or more instances may merge to become one network instance. Devices may make a merging or join decision to change the instance autonomously based on the TSF information collected from beacons received during scan periods or based on the TSF information collected from received beacon response messages. A merging decision may be performed when a device receives a beacon or beacon response message with an older (greater) TSF value from another wireless device. Alternatively a merging decision may be done based on some other information available in a beacon or beacon response message from another wireless device. After the merging decision has been performed by a device, the device moves into the new network instance.

The awareness functionality in a short-range wireless device may be divided between four layers of an awareness architecture. An awareness layer and a community layer may provide services for applications, e.g. by providing an awareness application program interface (API). The approximate functional split between the different layers may be as follows.

In accordance with an example embodiment, the present invention may be used in a logical architecture of the Neighbor Awareness Networking (NAN) program being standardized by the Wi-Fi Alliance (WFA). The NAN protocol stack is expected to comprise of two components: 1) NAN Discovery Engine, 2) MAC with NAN support. MAC with NAN support is a variant of Wi-Fi MAC and provides means for NAN devices to synchronize in time and frequency to provide common availability periods for service discovery frames from/to the NAN Discovery Engine.

The NAN Discovery Engine may provide Publish and Subscribe services to the applications for service discovery purposes. Publishing is an ability to make application-selected information about e.g. capabilities and services available for other NAN devices that seek information with Subscribing. The publishing ability may use protocols and mechanisms certified by the Neighbor Awareness Networking program. NAN devices that use Publishing may provide published information in an unsolicited or solicited manner. Subscribing is an ability to discover information that has been made available in other NAN devices with Publishing, using protocols and mechanisms certified by the Neighbor Awareness Networking program. NAN devices that use Subscribing may passively listen for or actively seek published information.

Publish and Subscribe services are expected to exploit a discovery protocol that the NAN Discovery Engine implements and which is designed for NAN. The protocol is expected to have different protocol messages. Examples of such messages include discovery messages. The discovery messages may include unsolicited discovery messages and solicited discovery messages. Solicited discovery messages may include: 1) Discovery query message, and 2) Discovery response message. The Subscribe service is expected to use the Discovery query message to conduct active discovery. The Subscribe service may be configured to operate in the passive mode only. In this mode, no Discovery query messages are transmitted, but one listens for Discovery response messages to find the information sought. The Publishing service is expected to use the Discovery response message to announce availability of application-selected information to discovering devices.

In an embodiment, the Discovery query message may be a (NAN) Service Discovery frame of type Subscribe, or a subscribe message. Further, the Discovery response message may be a (NAN) Service Discovery frame of type Publish, or a publish message. The Service Discovery frame of type Publish, or the publish message may be transmitted in an unsolicited manner, e.g. periodically.

A (NAN) discovery message may be comprised in a discovery frame comprising one or more service descriptor attributes that each relate to a service associated with the discovery frame. As described above, the discovery message may be a publish, a subscribe, or a follow-up message provided in the frame. The service descriptor attribute may be understood as a message header which contains, as an example, a service identifier sub-field, an instance identifier, and a service control sub-field. The service identifier sub-field carries identifier of the service. The service control sub-field, or other field, may indicate whether the message is of publish, subscribe, or follow-up type. The service control sub-field may have a length of one octet and two bits may be used to perform the indication. The frame may carry multiple discovery messages and each discovery message may have a unique service descriptor attribute.

A device in which the Subscribe service has been activated in active mode, transmits Discovery query messages to trigger Publishing devices to transmit Discovery response messages. In parallel, the Subscribing device monitors received Discovery response messages to determine the availability of services and information being sought. Monitoring is envisioned to be a continuous process that applies to all Discovery response messages received while the Subscribe service is active. With this approach, a Subscribing device may gather valuable information from Discovery response messages that are independent from its own Discovery query message transmissions.

Upon activating the NAN functions in a device, the device first looks for a NAN network by means of passive discovery. The NAN functions are activated by an application in the device requesting either the Subscribe or the Publish service to be activated, when there is no service active in the NAN Discovery Engine. On default, there is at least one NAN ID that is determined in a NAN specification and the NAN device looks for such a network and its clusters. With respect to joining a NAN network/NAN cluster, if the device finds at least one NAN cluster that the device may join, the device selects a cluster and joins it. If the device finds no NAN cluster that the device may join, the device establishes a NAN cluster of its own. An application may have also requested the Publish service to be activated in a passive mode. In such case the device doesn't ever establish a NAN cluster, but it only operates in NAN clusters that have been established by others.

Recent developments in 802.11 work groups have involved introduction of a new low-power radio interface called a wake-up radio (WUR). The WUR has been discussed in a WUR study group. A new task group, TGba, has been established and it will continue the work of the study group. One purpose of the new radio interface is to enable further power-savings by allowing a main radio (also known as a primary connectivity radio) interface used for data communication according to 802.11 specifications to doze for longer periods. The low-power radio interface is called in the study group a wake-up radio (WUR) receiver or a low-power WUR (LP-WUR) receiver, and it is considered to be a companion radio to the primary connectivity radio. A wireless device such as the STA may comprise both a WUR interface and the main 802.11 interface. An access node may comprise a WUR interface and the main 802.11 interface. To summarize, a device of the wireless network may include a wake-up radio (WUR) interface and a main radio interface. It has been proposed that the purpose of the wake-up radio interface is only or mainly to wake-up the main radio interface e.g. when the access node has data to transmit to a dozing STA having disabled the main radio interface.

The wake-up radio interface may be designed such that it consumes less power than the main radio interface. The wake-up radio interface may employ a simpler modulation scheme than the main radio interface, e.g. the wake-up radio interface may use only on-off keying (OOK) while the main radio interface uses variable and more complex modulations schemes such as phase-shift keying and (quadrature) amplitude modulation. The wake-up radio interface may operate on a smaller bandwidth than the smallest operational bandwidth of the main radio interface, e.g. 5 Megahertz (MHz) for the wake-up radio and 20 MHz for the smallest bandwidth of the main radio interface.

Since the main purpose of the wake-up radio interface is to wake up the main radio interface, the wake-up radio interface may be powered on when the main radio interface is powered off. A wake-up radio interface of the STA may be configured to receive and extract wake-up radio frames transmitted by a wake-up radio interface of the access node.

The wake-up radio interface of a wireless device may be capable of decoding the wake-up radio frames on its own without any help from the main radio interface. Accordingly, the wake-up radio interface may comprise, in addition to a radio frequency front-end receiver components, digital baseband receiver components and a frame extraction processor capable of decoding contents of a wake-up radio frame. The wake-up radio frame may comprise a destination address field indicating a wireless device that should wake up the main radio interface, and the frame extraction processor may perform decoding of the destination address from a received wake-up radio frame and determine whether or not the destination address is an address of the wireless device of the frame extraction processor. If yes, it may output a wake-up signal causing the main radio interface to wake up for radio communication with an access node or another device, e.g. the one from which the wake-up radio frame was received.

Figure 2:
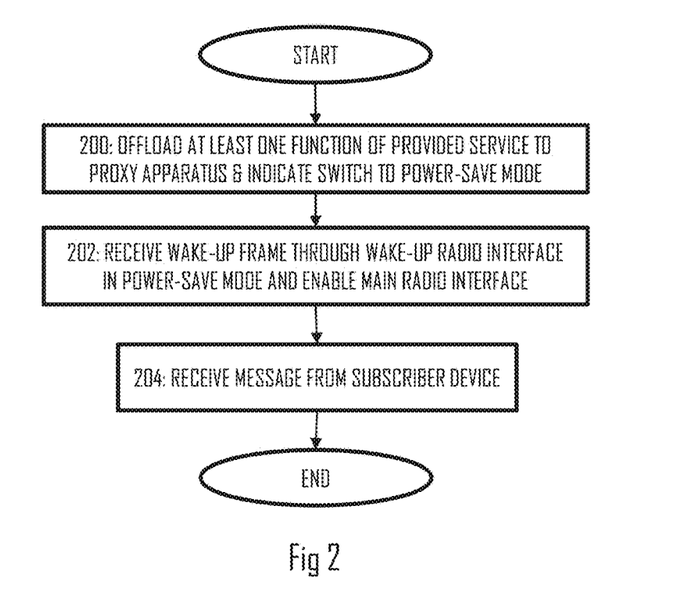
FIGS. 2 and 3 illustrate processes for offloading at least one function of a service from a wireless device to a proxy apparatus according to some embodiments of the invention.
Figure 3:
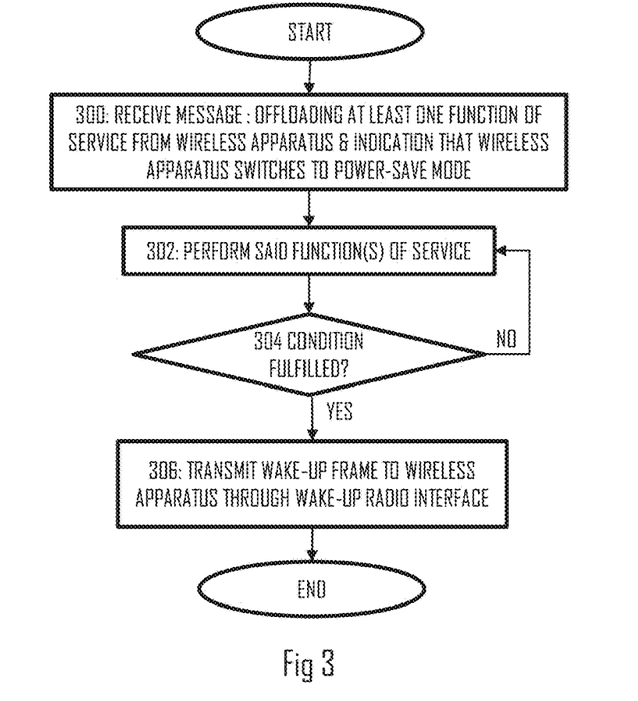
Figure 4:
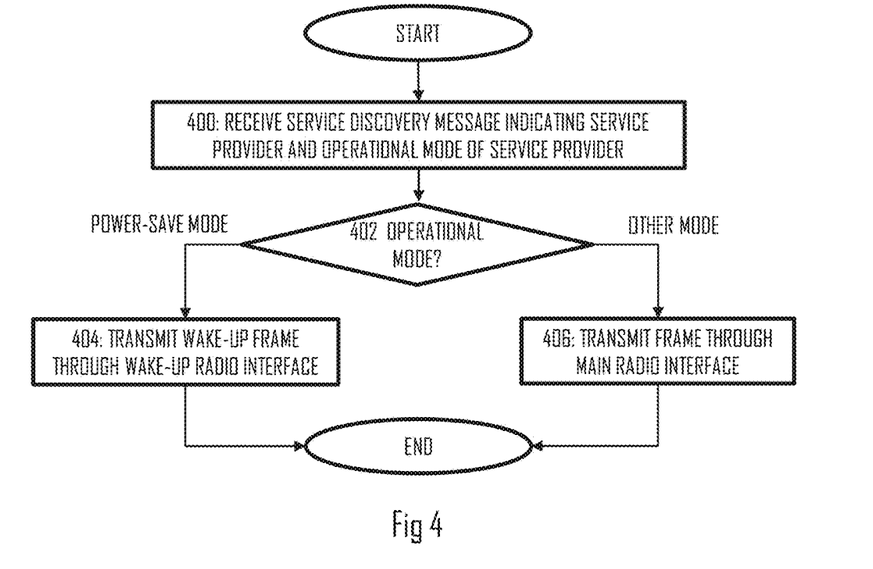
FIG. 4 illustrates a process in a subscriber device of a service provided by a wireless apparatus according to an embodiment.

A wireless device of the wireless network may be configured to provide other wireless devices with a service that may involve frame transmissions between the service provider device and a service subscriber device. The service may be an application layer service such as a location service, a gaming service, an information provisioning service, a measurement service, etc. It would be advantageous to improve power-saving capabilities of the wireless device that provides the service. FIGS. 2 to 4 illustrate processes for enabling such power-savings.

FIG. 2 illustrates a process for improving power-savings in the wireless device. Referring to FIG. 2, the process comprises as performed by the wireless device: offloading (block 200) at least one function of the service to a proxy apparatus by using a main radio interface of the first wireless device; indicating, to the proxy apparatus in connection with said offloading, that the wireless device shall enter a power-save mode where the wireless device disables the main radio interface and enables a wake-up radio interface of the wireless device; receiving (block 202), while in the power-save mode, a wake-up frame through the wake-up radio interface and, as a response to the reception of the wake-up frame, enabling the main radio interface; and after enabling the main radio interface, receiving (block 204) a message from a subscriber device that subscribes to the service.

FIG. 3 illustrates another process for enabling power-savings in the wireless device. The process comprises as performed by the proxy apparatus: receiving (block 300) at least one message from the wireless device configured to provide the service, the at least one message offloading the at least one function of the service to the proxy apparatus, the at least one message further indicating that the wireless device shall enter the power-save mode; performing (block 302) the at least one function of the service; and as a result of said performing, transmitting (block 306) to the wireless device operating in the power-save mode, the wake-up frame through a wake-up radio interface of the proxy apparatus.

In an embodiment, the proxy apparatus may in block 304 determine whether or not a condition of the service associated with the function(s) has been fulfilled. If the condition has been fulfilled, the process may proceed to block 306. Otherwise, the process may return to block 302.

FIG. 4 illustrates another process for enabling power-savings in the wireless device. The process comprises as performed by the subscriber device: receiving (block 400), from the proxy apparatus, a service discovery message comprising at least one information element indicating that the wireless device provides the service and further comprising at least one information element indicating that the wireless device is currently in the power-save mode; and as a response to receiving the service discovery message, transmitting (block 404) to the wireless device operating in the power-save mode, a wake-up frame through a wake-up radio interface of the subscriber device.

In an embodiment, the subscriber device determines the operational mode of the wireless device in block 402. If the operational mode is determined to be the power-save mode, the process proceeds to block 404. If the operational mode is determined to another mode where the main radio interface of the wireless device is enabled, the process may proceed to block 406 where the subscriber device transmits a frame to the wireless device through a main radio interface of the subscriber device.

The reader is advised that in some embodiments, the subscriber device does not necessarily yet subscribe to the service while performing the process of FIG. 4. However, it is the intention in such embodiments that the subscriber device is capable of subscribing to the service and may have the intention to subscribe to the service while performing the process of FIG. 4. In other embodiments, the subscriber device may readily subscribe to the service while performing the process of FIG. 4. Also, the proxy apparatus refers to the capability of the proxy apparatus to provide the function(s) of the service on behalf of the wireless device, i.e. to operate as a proxy with respect to the function(s). In such a context, the proxy apparatus may be called a proxy server, and the wireless device may be called a proxy client.

Figure 5:
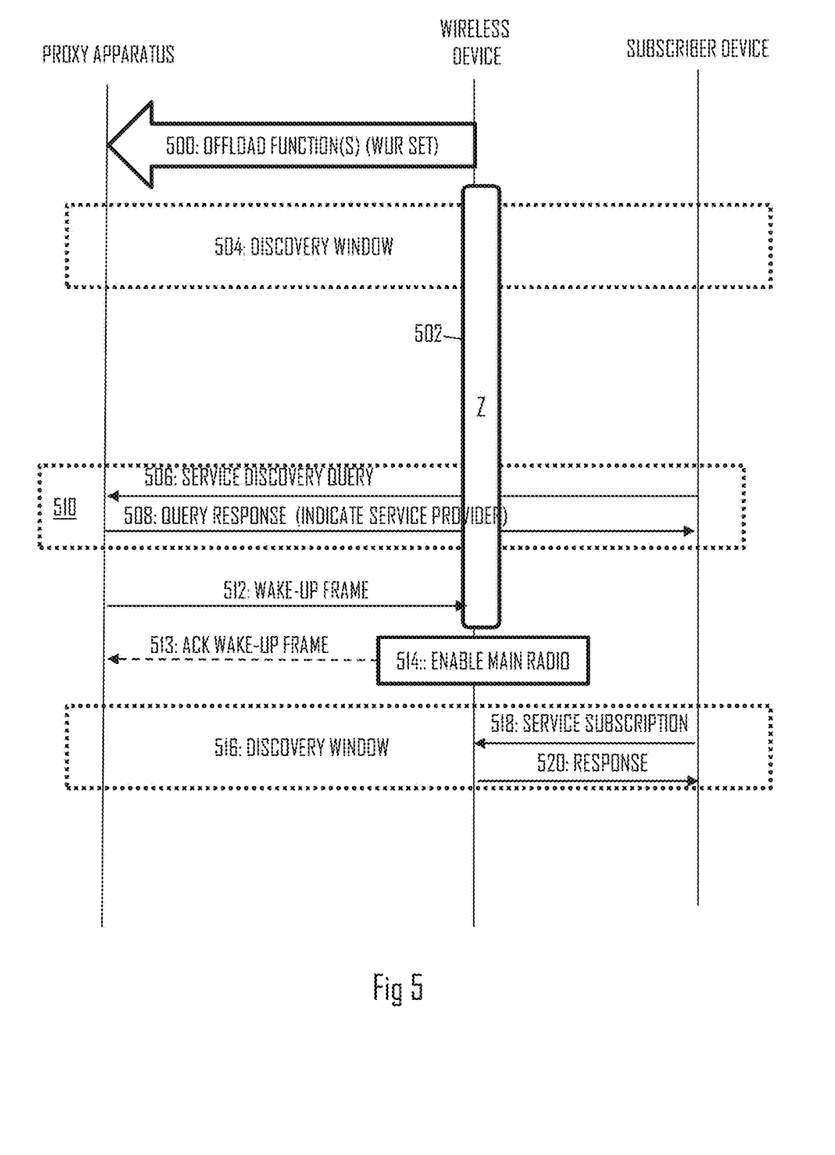
FIGS. 5 to 7 illustrate signalling diagrams for an embodiment where a service discovery function of a service is offloaded to a proxy apparatus.
Figure 6:
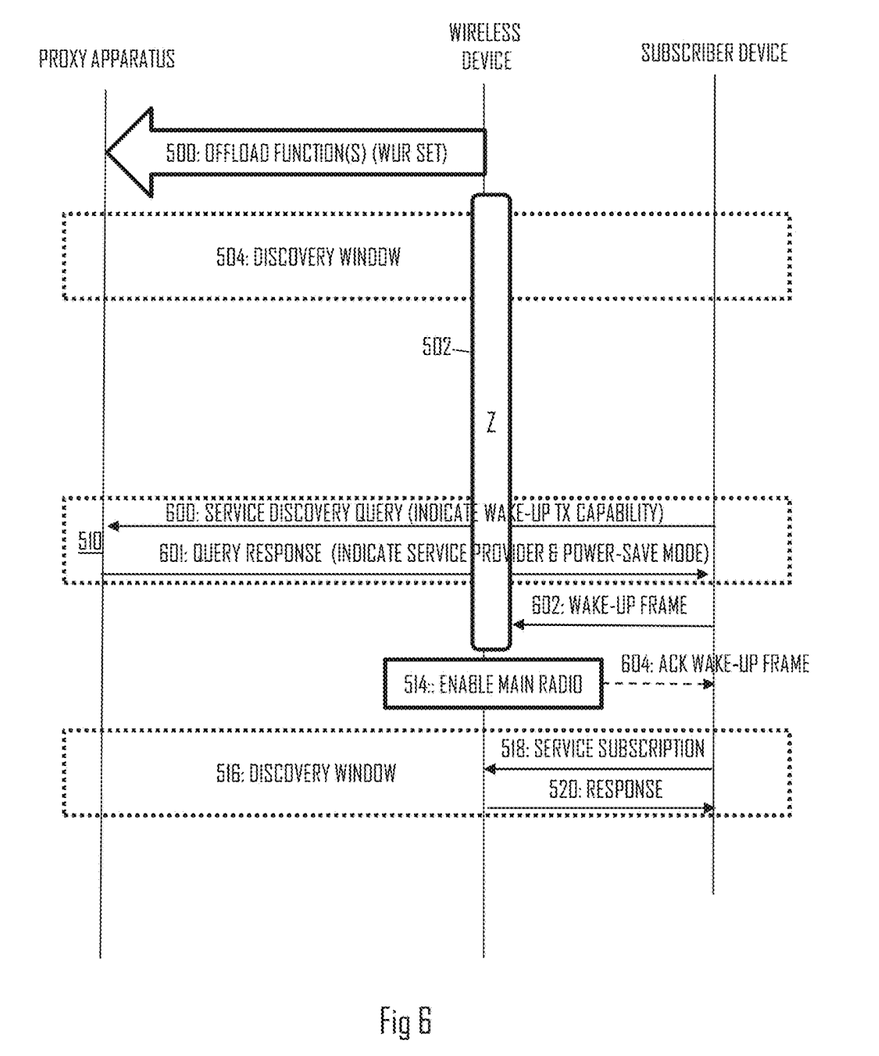
Figure 7:
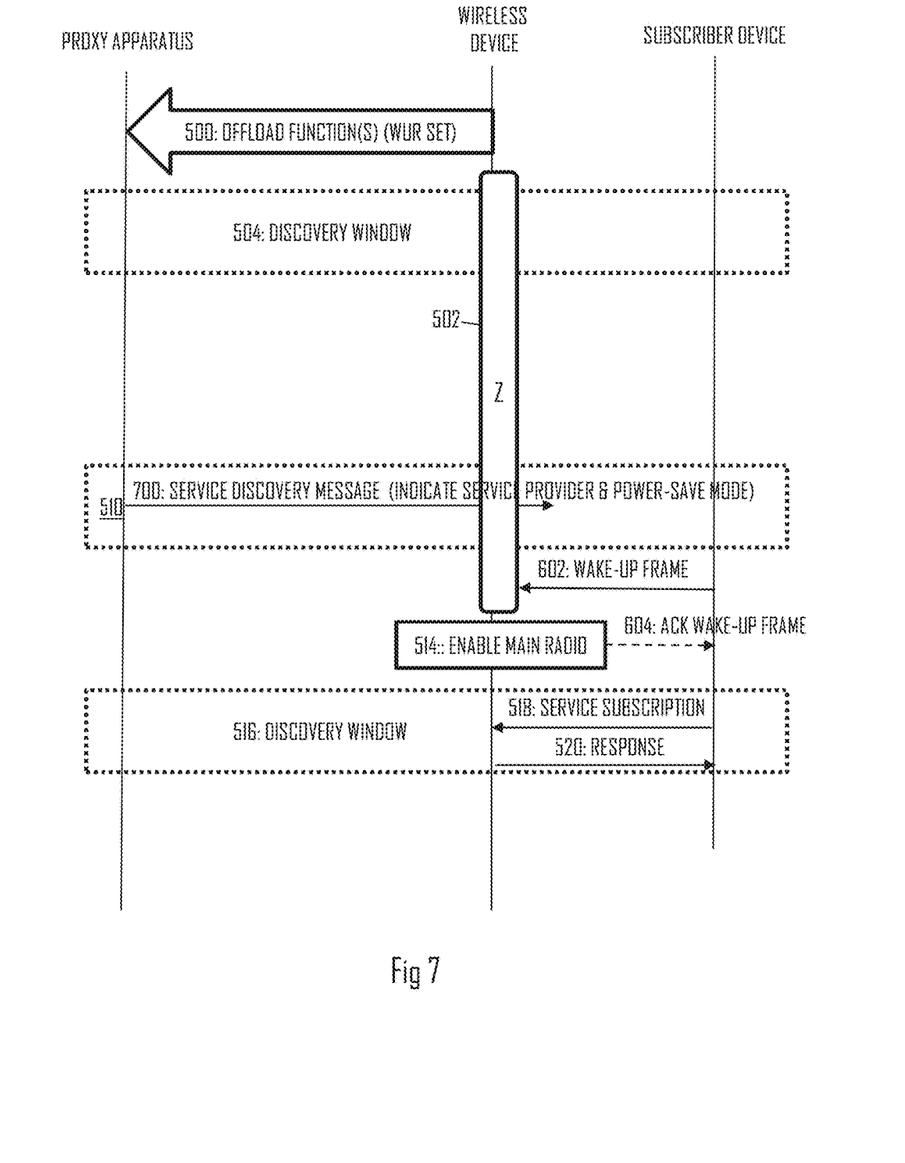

In an embodiment, the function(s) offloaded from the wireless device to the proxy apparatus include service discovery of the service. FIGS. 5 to 7 illustrate embodiments where the proxy apparatus proxies the service discovery. In all embodiments, the proxy apparatus, the wireless device, and the subscriber device may be any devices 100 to 114 of FIG. 1

Referring to FIG. 5, the wireless device offloads the function(s) of the service to the proxy apparatus in block 500. The function(s) may include the service discovery for the service. The wireless device may also indicate the intention to enter the power-save mode in block 500. The wireless device may provide the indication in the form of at least one information element comprised in a frame transmitted to the proxy apparatus in block 500. The at least one information element may be a one-bit indicator. The frame may further comprise an information element identifying the service. The frame may further comprise at least one information element indicating the function(s) that are being offloaded to the proxy apparatus.

Before block 500, the wireless device may first discover a suitable device to operate as the proxy apparatus. For example, one requirement may be that the proxy apparatus supports the wake-up radio and has the capability to wake up the wireless device by using the wake-up radio interface. The discovery may be carried out by using a service discovery procedure where the proxy apparatus publishes or otherwise advertises a proxy service for the service provided by the wireless device. The publishing/advertising may be carried out by the proxy apparatus by broadcasting or otherwise transmitting a frame indicating the proxy service and further indicating the wake-up capability. The indication may be provided in a field comprised in the frame. The field may be within a service descriptor extension attribute included in every publish/advertise message transmitted by the proxy apparatus. Upon detecting a proxy apparatus that supports the wake-up radio, the wireless device may determine to offload the function(s) to such a proxy apparatus in block 500.

In an embodiment, the proxy apparatus may indicate the capability for wake-up radio transmissions during the service discovery procedure, e.g. together with advertising the proxy service. In another embodiment, the proxy apparatus may indicate the capability for wake-up radio transmissions in another context, e.g. in a beacon frame. The beacon frame may be a NAN beacon frame, e.g. a NAN synchronization beacon and/or a NAN discovery beacon.

An embodiment of block 500 is described below in connection with FIG. 9.

Upon offloading the at least function of the service to the proxy apparatus and indicating the intention to enter the power-save mode, the wireless device may enter the power-save mode in 502. Accordingly, the wireless device may disable its main radio interface and enable the wake-up radio interface of the wireless device. The wireless device may stay in the power-save mode over at least one discovery window 504, 510, e.g. a NAN discovery window. The discovery window may be a time window where the subscriber device has an opportunity to subscribe to the service or to transmit a discovery message related to the service. The discovery window may be defined as a time interval dedicated to service discovery. For example, transmission of frames other than discovery messages may be limited or even prevented. In the NAN system, a NAN device may be configured to transmit the following management frames in the discovery window: a synchronization beacon, a service discovery frame, and an action frame. A data frame transmission may be prevented during the discovery windows. However, since the wireless device is in the power-save mode, the wireless device cannot receive any frames or subscriptions through the main radio interface during the discovery windows 504, 510 and, as a consequence, cannot perform actions according to the service discovery procedure for the service, e.g. receive or transmit service discovery frames corresponding to publishing and/or subscribing functions.

However, since the service discovery has been offloaded to the proxy apparatus, the subscriber device may perform the service discovery on behalf of the wireless device. Upon determining to search for the service, the subscriber device may transmit a service discovery query message in step 506. The message may include an identifier of the service the subscriber device is searching for. Upon detecting the service discovery query message in step 506 and determining that the service identified in the message is the service proxied by the proxy apparatus, the proxy apparatus may generate a query response message. The query response message may include at least one information element indicating that the wireless device is the provider of the service. Upon generating the query response message, the proxy apparatus may transmit the query response message to the subscriber device in step 508 as a response to the query. The steps 506 and 508 are performed by using a main radio interface of the proxy apparatus.

In an embodiment, steps 506 and 508 are performed within a discovery window, e.g. the discovery window 510 as illustrated in FIG. 5. In another embodiment, the steps 506 and 508 are performed during consecutive discovery windows, e.g. windows 504 and 510. In an embodiment, one of steps 506 and 508 is performed within a discovery window and the other one of the steps 506 and 508 is performed outside the discovery window.

In an embodiment, the wake-up frame is transmitted between consecutive discovery windows.

Upon transmitting the response in step 508, the proxy apparatus may generate a wake-up frame and transmit the wake-up frame to the wireless device by using the wake-up radio interface of the proxy apparatus (step 512). The proxy apparatus may control the transmission timing of the wake-up frame such that there is enough time for the wireless device to wake up before the discovery window 516 where the wireless device should be awake. Accordingly, a duration between the steps 508 and 512 may vary according to the timing of step 512 and the timing of the discovery window where the wireless device is determined to be awake. Upon receiving the wake-up frame in step 512 and determining that the wake-up frame is addressed to the wireless device, the wireless device may enable its main radio interface (block 514).

The wireless device may be configured to acknowledge reception of the wake-up frame and activation of the main radio interface in step 513. In an embodiment, the wireless device transmits the acknowledgment through the main radio interface. This may be suitable in a case where the wireless device and the proxy apparatus have established an association. In another embodiment, the wireless device transmits the acknowledgment through the wake-up radio interface. The acknowledgment may be a WUR acknowledgment (ACK) frame defined in the specifications of the Wi-Fi Aware. In yet another embodiment, the wireless device may perform the acknowledgment by transmitting one or more wake-up frames through the wake-up radio interface. Upon detecting the wake-up frames from the wireless device through the wake-up radio interface, the proxy apparatus may determine that the wireless device has exited the power-save mode.

Upon receiving the query response in step 508, the subscriber device may determine a following discovery window where it will transmit a frame to the wireless device. The determined discovery window may be the next discovery window that begins after reception of the query response. Referring to FIG. 5 where the query response is received within the discovery window 510, the determined discovery window will be the discovery window 516. In another embodiment, the proxy apparatus may indicate in the query response the discovery window where the wireless device is assumed to be reachable. It may be indicated as n discovery windows after the transmission/reception of the query response, where n>=1. Upon enabling the main radio interface, the wireless device monitors a radio channel for frames addressed to itself. The subscriber device that received the query response is aware of the service provider and may then transmit a service subscription message addressed to the wireless device (step 518). The service subscription message may be a unicast message including an identifier of the wireless device in a receiver address field. The service subscription message may further include at least one information element identifying the service and indicating that the subscriber device subscribes to the service. Upon receiving the service subscription message, the wireless device may perform one or more functions mandated by the reception of the service subscription message. For example, if the service subscription message indicates that the subscriber devices requests for registration to the service, the wireless device may register the subscriber device to the service. If the service subscription message indicates that the subscriber devices requests for data related to the service, the wireless device may generate a message comprising the requested data. In yet another example, the service subscription message is used to verify that the subscriber device and the wireless device are capable of communicating with one another over a radio link, i.e. that they are within each other's radio range. A response to the service subscription message may then contain basic information on the service. In step 520, the wireless device transmits a response to the service subscription message. In the context of NAN, the response may be a Publish message.

In an embodiment, the wireless device indicates in 500 that it will enter the power-save mode without specifying when it will return to an active mode where the main radio interface is enabled. In such an embodiment, the proxy apparatus may assume that the wireless device can only be reached by first waking the wireless device up by using the wake-up radio interface. This embodiment also enables the proxy apparatus to control when the wireless device shall be woken up. For example, if the discovery window 516 is known to be overloaded, the proxy apparatus may postpone the transmission of the wake-up frame beyond the discovery window 516. The proxy apparatus may also inform the subscriber device that the wireless device can be reached after the discovery window 516.

In an embodiment, the wireless device may indicate in block 500 a minimum period between wake-up frames transmitted to the wireless device. The minimum period may also cover a minimum time interval between transmission of a frame in step 500 and the first wake-up frame. When the proxy apparatus receives the service discovery query (step 506), the proxy apparatus may select the discovery window to indicate to the subscriber device on the basis of the minimum period received from the wireless device.

In an embodiment, the wireless device indicates in 500 that it will enter the power-save mode and specifies when it will return to an active mode. For example, the wireless device may indicate that it will be awake every $k^{th}$ discovery window where k>1. As another example, the wireless device may indicate that it will be awake after K discovery windows where K>2. In such an embodiment, the proxy apparatus may, upon receiving the service discovery query, provide the subscriber device with information on the discovery window where the wireless device is available. The information may be provided as an information element in the query response message in step 508. Accordingly, the subscriber device may wait until the indicated discovery window before transmitting the service subscription message. The subscriber device may wait over one or multiple discovery windows. This reduces unnecessary access attempts in discovery windows where the wireless device is in the power-save mode. The proxy apparatus may also refrain the transmission of the wakeup frame until the discovery window indicated by the wireless device.

FIG. 6 illustrates an embodiment where the subscriber device wakes the wireless device up from the power-save mode. The same reference numbers as in FIG. 5 refer to the same or substantially similar operations or functions. In this embodiment, the subscriber device may, upon detecting that the wireless device is the service provider for the service needed by the subscriber device and that the wireless device is in the power-save mode, transmit the wake-up frame to the wireless device through a wake-up radio interface of the subscriber device (step 602).

In the embodiment of FIG. 6, the service discovery query may be modified with respect to the embodiment of FIG. 5. The subscriber device may indicate, in an information element in the service discovery query message its capability for wake-up radio transmissions. If the subscriber device indicates the capability for wake-up radio transmissions, the proxy apparatus may indicate in the query response message (step 601) that the wireless device is in the power-save mode and that subscriber device should use the wake-up radio interface to wake up the wireless device before transmitting the service subscription message through the main radio interface. This indication may be provided in an additional information element in the query response message. Upon receiving the query response message and determining that the wireless device is the service provider and in the power-save mode, the subscriber device may transmit the wake-up frame to the wireless device through the wake-up radio interface in step 602. Upon receiving the wake-up frame and determining that the wake-up frame is addressed to the wireless device, the wireless device may enable the main radio interface (block 514) and, optionally, acknowledge the reception of the wake-up frame in step 604.

The embodiment of FIG. 6 is suitable for improving power-savings in situations where the wireless device is not in the range of the subscriber device. If the wireless device cannot receive the wake-up frame from the subscriber device, it is probable that it cannot receive the service subscription message either. Accordingly, it will not wake up unnecessarily.

FIG. 7 illustrates an embodiment where the proxy apparatus publishes service discovery messages for the service in an unsolicited manner. The proxy apparatus may periodically or according to another criterion broadcast (step 700) a service discovery message comprising an identifier of the service and an indication that the wireless device is the service provider. The service discovery message may further indicate that the wireless device is currently in the power-save mode.

In an embodiment, upon detecting the service discovery message the subscriber device may use its wake-up radio interface to wake up the wireless device, as described above in connection with FIG. 6.

In an embodiment, the service discovery message comprises an information element indicating a discovery window where the wireless device is back in the active mode and can be reached through the main radio interface. In this embodiment, the wireless device may indicate the discovery window(s) or time parameters of the power-save mode to the proxy apparatus in block 500.

Figure 8:
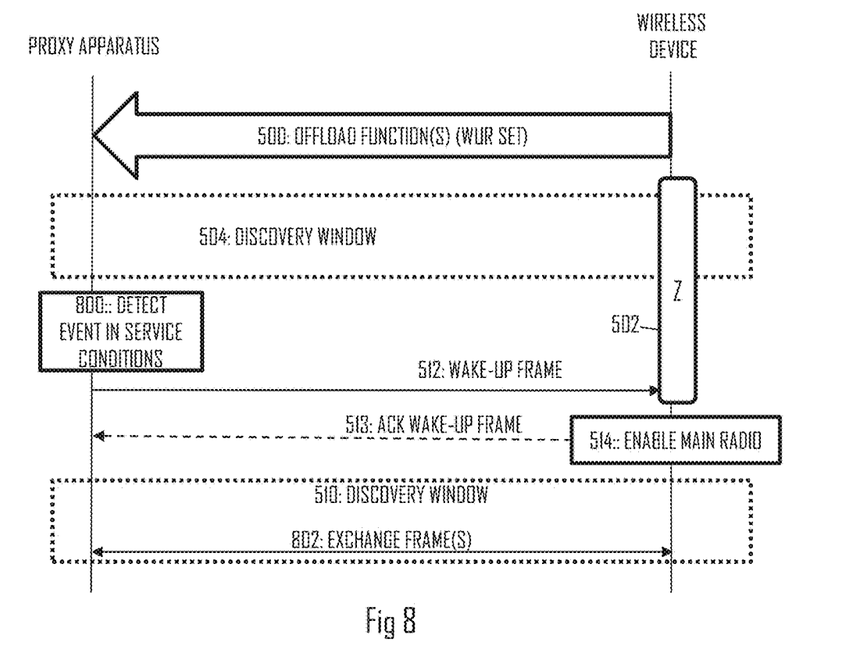
FIG. 8 illustrates a signalling diagram for an embodiment where an event of an offloaded function is used as a criterion for waking up a wireless device.

In the embodiments of FIGS. 5 to 7, the offloaded function is the service discovery. FIG. 8 illustrates an embodiment where the offloaded function may be another function, e.g. registering a service subscription. The diagram of FIG. 8 may thus be considered as a generalization of the embodiment of FIG. 5. The same reference numbers as in FIG. 5 represent the same or substantially similar operations or functions.

Referring to FIG. 8, after offloading the function(s) to the proxy apparatus (500) and entering the power-save mode (502), the proxy apparatus may execute the offloaded functions(s). In block 800, the proxy apparatus detects an event in service conditions when executing the functions(s). Upon detecting the event, the proxy apparatus may determine that the event triggers waking up the wireless device. As a consequence, the proxy apparatus may transmit the wake-up frame to the wireless apparatus in step 512 and wake the wireless apparatus up for the next discovery window 510. The proxy apparatus and the wireless device may then exchange one or more frames associated with the detected event in step 802.

In the embodiment of FIG. 5, the event is the reception of the service discovery query in step 506. In another embodiment where the offloaded function is the registering the subscribers to the service, the proxy apparatus may be configured to wake the wireless device up when a determined number of registrations have been performed. For example, the wireless device may want to save power until there exists a determined number of users for the service. Upon registering the required number of users to the service, the proxy apparatus may wake the wireless device up to provide the service to the registered subscriber devices. In such an embodiment, the frame exchange in step 802 may include transferring registration information on the subscriber devices registered to the service from the proxy apparatus to the wireless device.

In an embodiment where the proxy apparatus is the subscriber device, the proxy apparatus may determine to transmit the wake-up frame to the wireless device without first receiving the service discovery query. Upon determining to subscribe to the service, the proxy apparatus may be configured to transmit the wake-up frame to the wireless device and, upon waking the wireless device up, to transmit the service subscription message to the wireless device.

Figure 9:
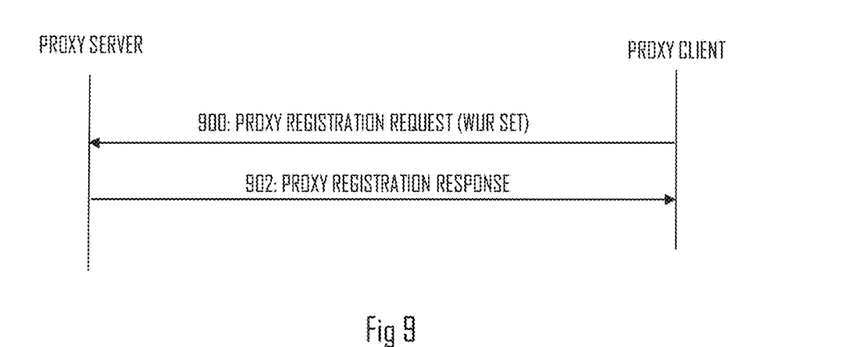
FIG. 9 illustrates an embodiment of offloading.

FIG. 9 illustrates an embodiment of block 500 in the context of Wi-Fi Aware. In this embodiment, the above-described wireless device is denoted by proxy client, and the proxy apparatus is denoted by a proxy server. It may be understood that the wireless device is a client for a proxy service provided by the proxy server. The proxy service is the execution of the selected function(s) on behalf of the wireless device. Referring to FIG. 9, the proxy client may request for the offloading by transmitting a proxy registration request message to the proxy in step 900.

The proxy server that receives the proxy registration request message may process the request and determine whether to accept the request or decline it. If the proxy server accepts the request, it may start the requested offloaded function(s), e.g. publishing on behalf of the proxy client if the request is on publishing. If the accepted request is on subscribing, the proxy server shall start subscribing on behalf of the proxy client. Once the proxy server has processed the request and decided whether to accept or decline it, the proxy server may generate a proxy registration response message and send it to the proxy client with an indication on whether the registration succeeded (step 902).

The above-described embodiments may be carried out in a wireless network comprising the proxy apparatus, the wireless device, and the subscriber device. The wireless network may be any one of the above-described networks, e.g. the NAN network.

Figure 10:
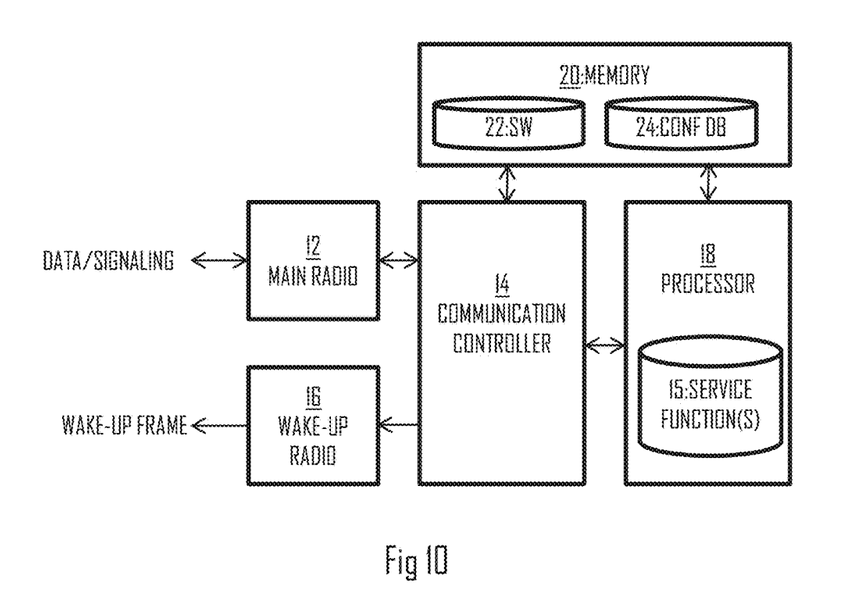
FIGS. 10 and 11 illustrate block diagrams of structures of apparatuses according to some embodiments of the invention.

FIG. 10 illustrates an embodiment of a structure of the above-mentioned functionalities of an apparatus executing the process of FIG. 3 or any one of the embodiments performed by the proxy apparatus. The apparatus may be the proxy apparatus. The apparatus may comply with specifications of an IEEE 802.11 network and/or another wireless network such as the NAN network. The apparatus may be an access node, a station and/or a mobile terminal. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in any one of the above-described devices. The apparatus may be an electronic device comprising electronic circuitries for realizing the embodiments of the present invention.

Referring to FIG. 10, the apparatus may comprise the above-described main radio interface 12 configured to provide the apparatus with capability for bidirectional communication with other wireless devices in a wireless network. The main radio interface 12 may operate according to 802.11 technology on a physical layer and a MAC layer, for example. The main radio interface 12 may comprise analogue radio communication components and digital baseband processing components for processing transmission and reception signals. The main radio interface 12 may support multiple modulation formats.

The apparatus may further comprise the above-described wake-up radio interface 16 comprising a transmission circuitry for generating and transmitting the wake-up frames. The wake-up radio interface 16 may be configured for transmission only but, in some embodiments, the wake-up radio interface may enable uplink communications where the wake-up radio interface 16 has reception capability. The wake-up radio interface 16 may comprise analogue radio communication components and digital baseband processing components for processing transmission and reception signals. The wake-up radio interface 16 may support a single modulation scheme only, e.g. the on-off keying.

The main radio interface and the wake-up radio interface may comprise radio interface components providing the apparatus with radio communication capability within one or more wireless networks. The radio interface components may comprise standard well-known components such as an amplifier, filter, frequency-converter, (de)modulator, and encoder/decoder circuitries and one or more antennas.

The apparatus may further comprise a memory 20 storing one or more computer program products 22 configuring the operation of at least one processor of the apparatus, e.g. a communication controller 14 or a processor 18 described below. The memory 20 may further store a configuration database 24 storing operational configurations of the apparatus. The configuration database may, for example, store configuration parameters for services and function(s) for which the apparatus is configured to operate as a proxy. The configuration database 24 may further store, in connection with the function(s), one or more criteria for transmitting a wake-up frame.

The apparatus may further comprise the communication controller 14 configured to control the operation of the main radio interface 12 and the wake-up radio interface 16. The apparatus may further comprise a processor or a processing circuitry 18 configured to control execution of the service function(s) 15 offloaded to the apparatus according to any one of the above-described embodiments. For example, the processor 18 may carry out the registration function(s) and register subscriber devices to the service on behalf of the wireless device providing the service and using the power-save mode. The processor 18 may control the communication controller 14 to carry out frame exchanges with the subscriber devices through the main radio interface 16. The processor may also monitor for the event(s) that trigger the transmission of the wake-up frame. Upon detecting such an event, the processor 18 may control the communication controller to carry out the transmission of the wake-up frame to the wireless device through the wake-up radio interface 16.

In an embodiment, the apparatus comprises at least one processor and at least one memory 20 including a computer program code 22, wherein the at least one memory and the computer program code are configured, with the at least one processor, to cause the apparatus to carry out the functionalities of the proxy apparatus according to any one of the embodiments of FIGS. 3 and 5 to 9. According to an aspect, when the at least one processor executes the computer program code, the computer program code causes the apparatus to carry out the functionalities according to any one of the embodiments of FIGS. 3 and 5 to 9. According to another embodiment, the apparatus comprises the at least one processor and at least one memory 20 including a computer program code 22, wherein the at least one processor and the computer program code 22 perform the at least some of the functionalities of the proxy apparatus according to any one of the embodiments of FIGS. 3 and 5 to 9. Accordingly, the at least one processor, the memory, and the computer program code form processing means for carrying out embodiments of the present invention in the proxy apparatus. According to yet another embodiment, the apparatus carrying out the embodiments of the invention in the proxy apparatus comprises a circuitry including at least one processor and at least one memory 20 including computer program code 22. When activated, the circuitry causes the apparatus to perform the at least some of the functionalities of the proxy apparatus according to any one of the embodiments of FIGS. 3 and 5 to 9.

Figure 11:
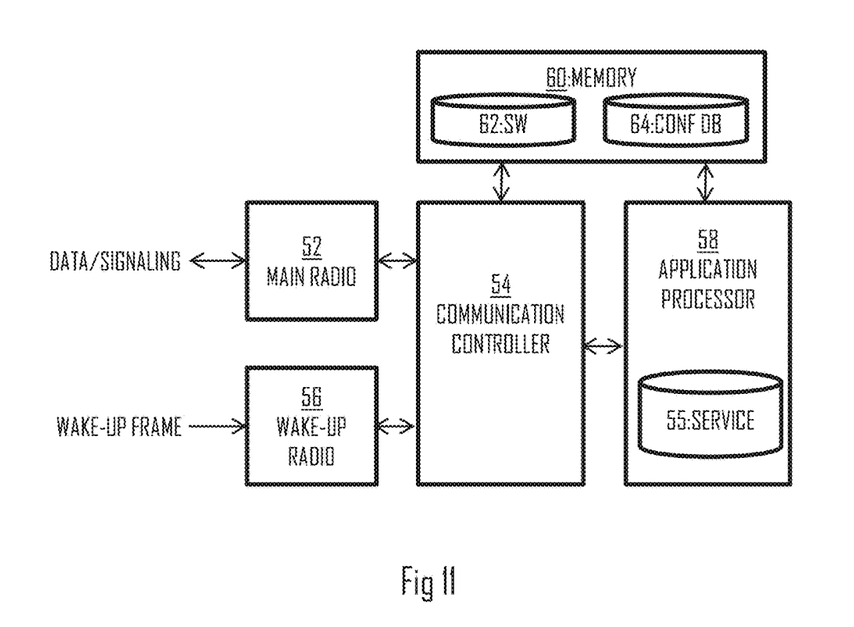

FIG. 11 illustrates an embodiment of a structure of the above-mentioned functionalities of the apparatus executing the process of FIG. 2 or any one of the embodiments performed by the wireless device. The apparatus may be the wireless device. The apparatus may comply with IEEE 802.11 technology and/or another wireless networking technology. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in any one of the above-described devices. The apparatus may be an electronic device comprising electronic circuitries for realizing the embodiments of the present invention.

Referring to FIG. 11, the apparatus may comprise the above-described main radio interface 52 configured to provide the apparatus with capability for bidirectional communication other wireless devices. The main radio interface 52 may operate according to 802.11 specifications, for example. The main radio interface 52 may comprise analogue radio communication components and digital baseband processing components for processing transmission and reception signals. The main radio interface 52 may support multiple modulation formats.

The apparatus may further comprise the above-described wake-up radio interface 56 comprising a reception circuitry for receiving the wake-up frames. The wake-up radio interface 56 may be configured for reception only but, in some embodiments, the wake-up radio interface may enable uplink communications where the wake-up radio interface 56 has transmission capability. The wake-up radio interface 56 may comprise analogue radio communication components and digital baseband processing components for processing transmission and reception signals. The wake-up radio interface 16 may support a single modulation scheme only, e.g. the on-off keying.

The main radio interface and the wake-up radio interface may comprise radio interface components providing the apparatus with radio communication capability within one or more wireless networks. The radio interface components may comprise standard well-known components such as an amplifier, filter, frequency-converter, (de)modulator, and encoder/decoder circuitries and one or more antennas.

The apparatus may further comprise a memory 60 storing one or more computer program products 62 configuring the operation of at least one processor of the apparatus. The memory 60 may further store a configuration database 64 storing operational configurations of the apparatus. The configuration database 64 may, for example, store configurations for different operational modes of the apparatus, e.g. the power-save mode and the active mode.

The apparatus may further comprise a communication controller 54 managing communications in the apparatus and controlling the operation of the radio interfaces 52, 56 according to the operational mode of the apparatus, for example. In the power-save mode, the communication controller 54 may disable the main radio interface 52 and enable the wake-up radio interface 56. In the active mode, the communication controller 54 may enable the main radio interface 52 and disable the wake-up radio interface 56.

The apparatus may further comprise an application processor 58 configured to execute the service 55 provided by the wireless device in the above-described manner. The application processor may determine to offload the function(s) to the proxy apparatus. Upon so determining, the application processor 58 may first control the communication controller 54 to use the main radio interface to search for a suitable proxy apparatus. Upon detecting the proxy apparatus, the application processor 58 may select the function(s) to be offloaded and control the communication controller to carry out the offloading according to any one of the above-described embodiments. Thereafter, the application processor may select the power-save mode as the operational mode of the apparatus. Accordingly, the communication controller 54 may disable the main radio interface 52 and enable the wake-up radio interface. Upon receiving the wake-up frame through the wake-up radio interface, the communication controller 54 may enable the main radio interface to receive frames within discovery windows. Upon receiving the service subscription message in step 518, for example, the communication controller 54 may forward contents of the message to the application processor for processing.

In an embodiment, the apparatus comprises at least one processor and at least one memory 60 including a computer program code 62, wherein the at least one memory and the computer program code are configured, with the at least one processor, to cause the apparatus to carry out the functionalities of the wireless device according to any one of the embodiments of FIGS. 2 and 5 to 9. According to an aspect, when the at least one processor executes the computer program code, the computer program code causes the apparatus to carry out the functionalities according to any one of the embodiments of FIGS. 2 and 5 to 9. According to another embodiment, the apparatus comprises the at least one processor and at least one memory 20 including a computer program code 22, wherein the at least one processor and the computer program code 22 perform the at least some of the functionalities of the wireless device according to any one of the embodiments of FIGS. 2 and 5 to 9. Accordingly, the at least one processor, the memory, and the computer program code form processing means for carrying out embodiments of the present invention in the wireless device. According to yet another embodiment, the apparatus carrying out the embodiments of the invention in the wireless device comprises a circuitry including at least one processor and at least one memory 20 including computer program code 22. When activated, the circuitry causes the apparatus to perform the at least some of the functionalities of the wireless device according to any one of the embodiments of FIGS. 2 and 5 to 9.

Above, embodiments of the main radio interface and the WUR interface have been described mainly in a context where they are defined as separate hardware interfaces. From another perspective, the interface may be understood as logical interfaces of radio links. The main radio interface may be a first end point of a first radio link (e g a main radio link) between wireless devices. The second radio interface (e.g. the WUR interface) may be a second end point of a second radio link (e g the WUR link) between the wireless devices. The first radio link may be used by a first radio device, e.g. a main radio device, and the second radio link may be used by a second radio device, e.g. a WUR radio device. The main radio interface and the WUR interface may have dedicated hardware. In another embodiment, the main radio interface and the WUR interface may share at least some hardware of the apparatus.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 9 may also be carried out in the form of one or more computer processes defined by one or more computer program. A separate computer program may be provided in each apparatus that executes functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
   at least one processor; and
   at least one memory including a computer program code, wherein the at least one memory and the computer program code are configured, with the at least one processor, to cause the apparatus to:
      receive at least one message from a wireless device configured to provide a service, the at least one message offloading at least one function of the service to the apparatus, the at least one message further indicating that the wireless device shall enter a power-save mode where the wireless device disables a main radio interface and enables a wake-up radio interface of the wireless device;
      perform the at least one function of the service by at least transmitting at least one service discovery frame comprising at least one information element indicating that the wireless device provides the service, wherein the at least one function comprises a service discovery function of the service; and
      as a result of the performing, transmit, to the wireless device operating in the power-save mode, a wake-up frame through the wake-up radio interface.

2. The apparatus of claim 1, the at least one message further indicating that the wireless device shall stay in the power-save mode over at least one discovery window of a wireless network, the wireless network comprising the wireless device and the apparatus.

3. The apparatus of claim 1, wherein the at least one service discovery frame comprises at least one information element indicating a discovery frame in which the wireless device provides the service.

4. The apparatus of claim 1, wherein the at least one memory and the computer program code are configured, with the at least one processor, to cause the apparatus to perform the at least one function by at least:
   receiving a service inquiry message from a device; and
   in response to the receiving the service inquiry message, transmitting the at least one service discovery frame comprising the at least one information element indicating that the wireless device provides the service and, further, transmitting the wake-up frame to the wireless device.

5. A method comprising:
   receiving, by a computing device, at least one message from a wireless device configured to provide a service, the at least one message offloading at least one function of the service to the computing device, the at least one message further indicating that the wireless device shall enter a power-save mode where the wireless device disables a main radio interface and enables a wake-up radio interface of the wireless device;
   performing, by the computing device, the at least one function of the service by at least transmitting at least one service discovery frame comprising at least one information element indicating that the wireless device provides the service, wherein the at least one function comprises a service discovery function of the service; and
   as a result of the performing, transmitting, by the computing device and to the wireless device operating in the power-save mode, a wake-up frame through the wake-up radio interface.

6. The method of claim 5, the at least one message further indicating that the wireless device shall stay in the power-save mode over at least one discovery window of a wireless network, the wireless network comprising the wireless device and the computing device.

7. The method of claim 5, wherein the at least one service discovery frame comprises at least one information element indicating a discovery frame in which the wireless device provides the service.

8. The method of claim 5, wherein the performing the at least one function comprises:
   receiving a service inquiry message from a device; and
   in response to the receiving the service inquiry message, transmitting the at least one service discovery frame comprising the at least one information element indicating that the wireless device provides the service and, further, transmitting the wake-up frame to the wireless device.

* * * * *